Jan. 19, 1960  D. H. WHITE  2,921,682
SEPARATION BY CRYSTALLIZATION
Filed Dec. 20, 1954  2 Sheets-Sheet 2
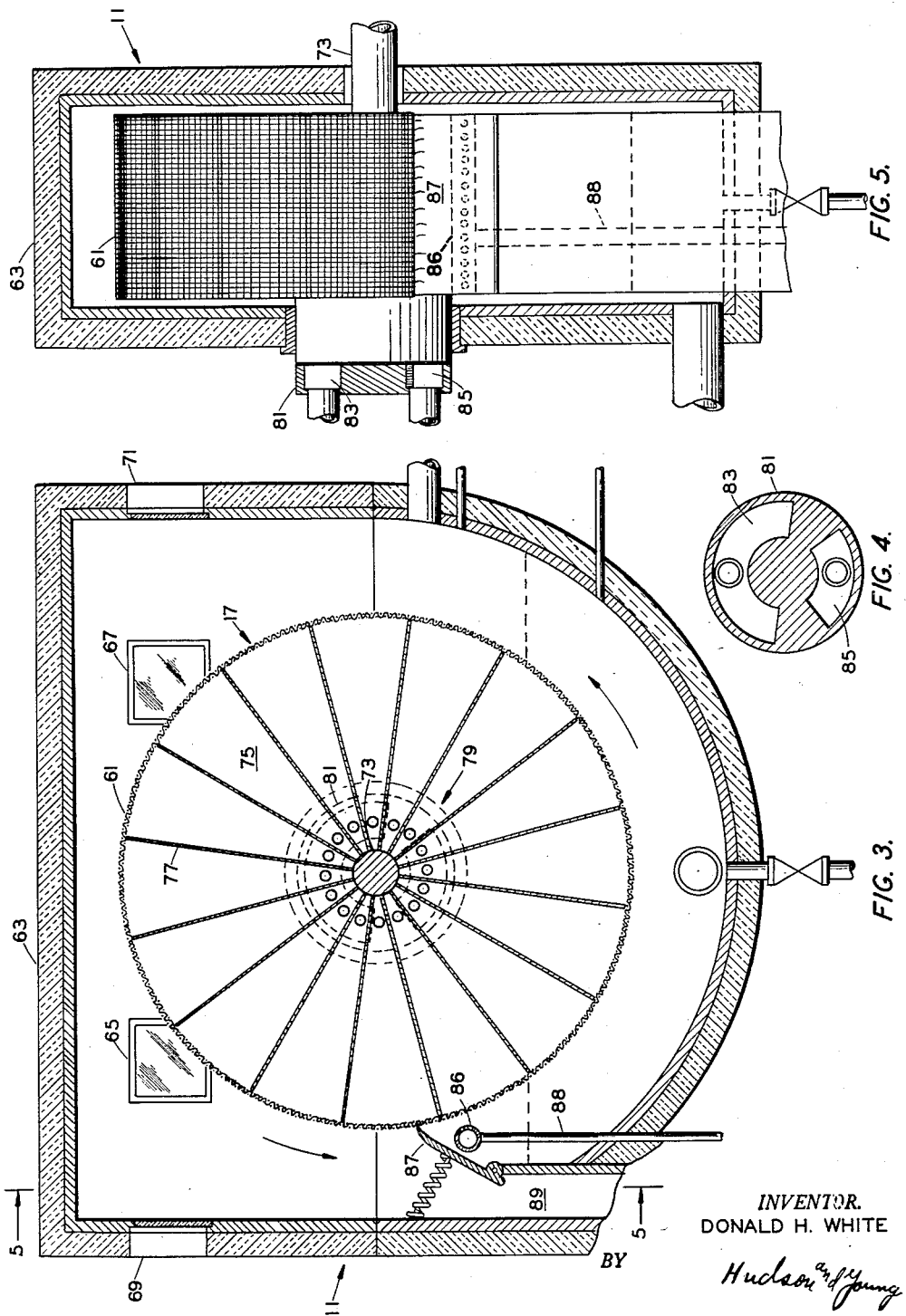
INVENTOR.
DONALD H. WHITE
BY Hudson and Young
ATTORNEY

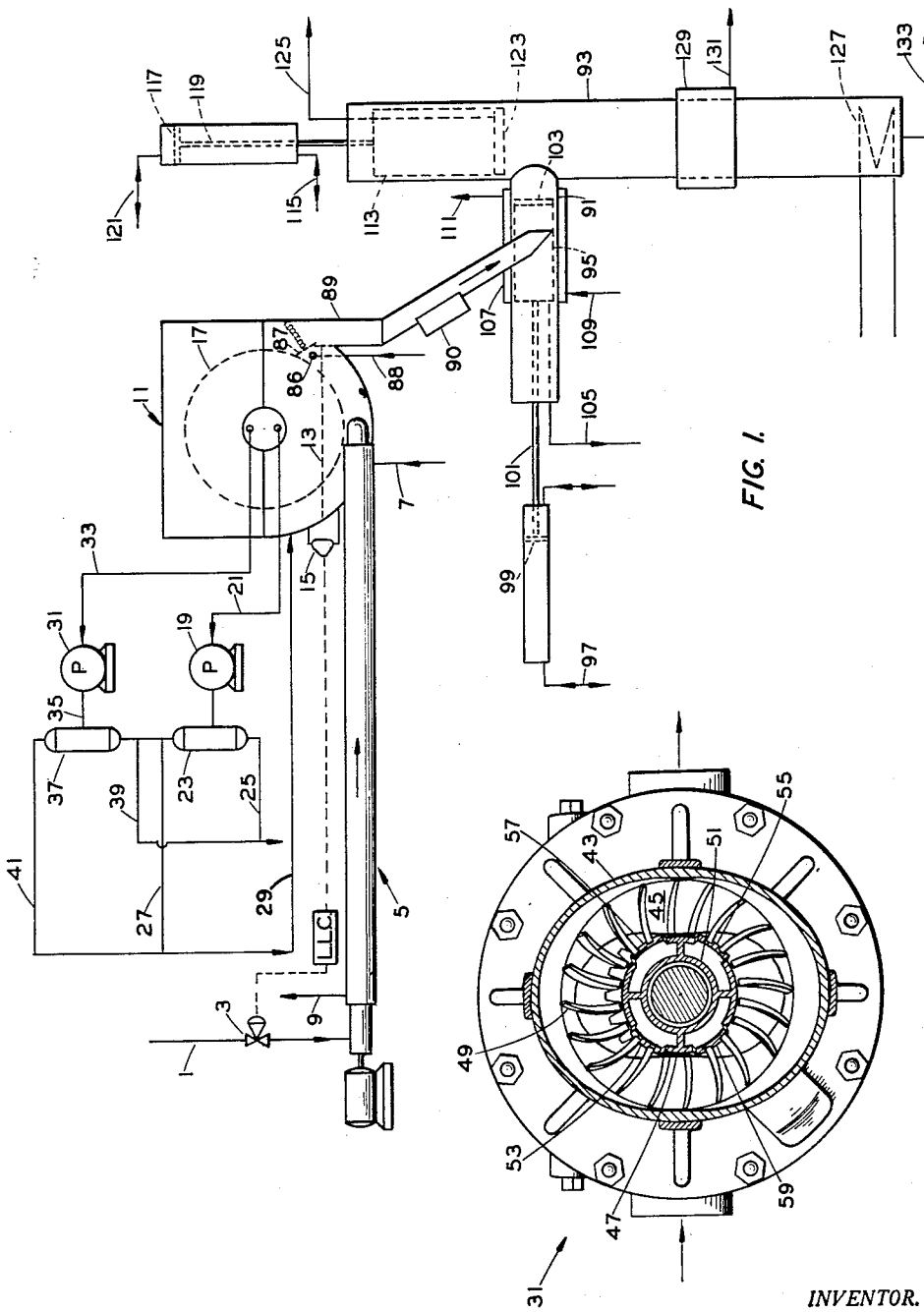

United States Patent Office 2,921,682
Patented Jan. 19, 1960

2,921,682

SEPARATION BY CRYSTALLIZATION

Donald H. White, Phillips, Tex., assignor to Phillips Petroleum Company, a corporation of Delaware Application December 20, 1954, Serial No. 476,533

6 Claims. (Cl. 210—81)

This invention relates to separation by crystallization. In one of its more specific aspects, the invention relates to an improved apparatus for the separation of components of mixtures by fractional crystallization. In another of its more specific aspects, the invention relates to an improved method and means for separating crystalline and non-crystalline material in a vacuum filter.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above that at which the other components solidify. Thus, whereas distillation and extraction theoretically require infinite stages for a pure product, crystillzation in many cases requires only one. This is because of the nature of the phase equilibria is distillation and extraction, while by crystallization, substantially pure crystals can be formed from many solutions in one stage, although the desired component may be of low concentration in the liquid feed.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

Methods of separating a pure component from a mixture have been devised whereby the mixture to be separated is introduced into a heat exchange zone wherein a mixture of crystals and liquid is formed and that mixture is then introduced into an elongated purification chamber through which the crystals are moved as a compact mass. One such means for purifying crystals has been disclosed by J. Schmidt, Re. 23,810.

In the process disclosed by J. Schmidt, a mass of crystals is moved through an elongated chamber to a melting zone wherein the crystals are melted. A portion of liquid corresponding to the melt is caused to move countercurrently through at least a portion of the crystal mass so as to displace occluded impurities from the crystal mass approaching the melting zone. The exact mechanism whereby this displacing liquid corresponding to the melt improves the purity if the final product is not completely understood. However, it is presently believed that the substantially pure material which is refluxed through at least a portion of the crystal mass displaces occluded impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

In order to separate constituents of mixtures by fractional crystallization, it is necessary to adjust the temperature of the mixture to one which is below the temperature at which crystals form of any one of the pure constituents. For example, when para-xylene is separated from a mixture of isomeric $C_8$ alkyl benzenes, it is necessary to cool the mixture to a temperature in the neighborhood of about −57° to about −78° C. Generally, the desired constituent is relatively dilute in the liquid feed mixtures and, upon such cooling, crystals and a substantial volume of mother liquor are formed.

An effective system for removing mother liquor from the crystals is a vacuum filter, such as a rotary- or belt-type vacuum filter. In such a system, the crystal slurry is deposited on the filter medium and mother liquor is pulled through the crystals by a vacuum pump. Where the system operates at low temperature, such as that described above, one of the problems is to maintain a high thermal efficiency in the filter system.

In handling very cold crystal slurries, it has been found desirable to employ a closed filter system, so that gases which are pulled through the cake of crystals in the filter medium by the vacuum pump, are recycled to the filter medium. A pressure at least equal to atmospheric pressure, preferably a slight positive pressure, of these recycled gases is maintained about the filter medium so that fresh air does not enter the system to thereby lower its thermal efficiency. Also, fresh air introduces water vapor which is very undesirable when handling cold slurries of crystals, since the water vapor freezes on the filter medium and causes the filter medium to become plugged.

In the vacuum filter systems, such as have been described above, a dry vacuum pump has been used in the prior art. The dry vacuum pump operates on the entrained gas which has been separated from the mother liquor removed from the filter cake. However, such a dry vacuum pump develops heat in its operation and coolers have been required to lower the temperature of the gases discharged from the pump before being returned to the filter. Thus, a need exists for a vacuum filter system having an improved thermal efficiency for handling crystal slurries at low temperatures.

An object of this invention is, therefore, to provide an improved system for the separation of a pure component from liquid mixtures.

Another object is to provide an improved vacuum filter system for removing mother liquor from a slurry of crystals.

A further object is to povide a vacuum filter system for handling very cold crystal slurries which has an improved thermal efficiency and does not become plugged.

Other objects of the invention will be apparent to those skilled in the art upon study of the accompanying disclosure.

In accordance with this invention, a wet vacuum pump is used in a vacuum filter system for removing mother liquor from a slurry of crystals. The wet vacuum pump handles the total mother liquor stream removed from the filter, including entrained gases, and since the entrained gases are thereby continually in contact with the cold mother liquor until just before they are returned to the filtering medium itself, the entrained gases do not become heated in the vacuum pump. The result is that coolers for the entrained gases found in vacuum filter systems of the prior art can be eliminated with consequent savings in equipment and investment. In accordance with this invention the entrained gases are maintained at substantially the same temperature as the mother liquor throughout the vacuum filter system and this provides an improvement in the thermal efficiency of the system. In those filter systems which are operated at very low temperature, little or no outside gases, such as fresh air, can enter the system and carry into it water vapor which causes the formation of ice and other difficultly removable crystals on the filter medium. A further improvement over the vacuum filter systems of the prior art, in accordance with this invention, resides in a system for completely removing any crystalline material which remains on the filter medium to plug off the filter medium. The over-all improved vacuum filter system of this invention is particularly well adapted to handle cold crystal slurries, since ice formation is minimized and means are provided for removing ice or other crystalline material from the filter medium very effectively, to thereby prevent the filter medium from becoming plugged. It will be readily appreciated by those skilled in the art that my invention has broad application to vacuum filter systems whenever it is desirable that entrained gases in the mother liquor be maintained at substantially the same temperature as the mother liquor itself. A preferred embodiment of my invention resides in an apparatus wherein the mother liquor is removed from the crystals in a rotary vacuum filter while introducing the crystals into an upright purification chamber. The crystals are moved downwardly in the purification chamber as an elongated crystal mass to a melting zone in the downstream end thereof. At least a portion of the crystals is melted and a small portion of the melt is displaced countercurrently through at least a portion of the crystal mass so as to displace occluded impurities therefrom.

Although, as I have pointed out hereinbefore, this invention is particularly applicable to systems in which the temperature at which crystals of the desired pure component form is considerably higher than the temperature to which the component is cooled in the liquid mixture to form crystals thereof, this procedure can be advantageously utilized in practically any system to which fractional crystallization is applicable so as to increase the efficiency of the process. This invention is applicable to the separations in many multicomponent systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a product purity upwards of 98 percent. In order to illustrate some of the systems to which the invention is applicable, the following compounds are grouped with respect to their boiling points.

| Group A | B.P., °C. | F.P., °C. |
|---|---|---|
| Benzene | 80 | 5.5 |
| n-Hexane | 69 | −04 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
|---|---|---|
| ortho-Xylene | 144 | −27.1 |
| meta-Xylene | 138.8 | −47.4 |
| para-Xylene | 138.5 | 13.2 |

| Group G | B.P., °C. | F.P., °C. |
|---|---|---|
| ortho-Cymene | 175.0 | −73.5 |
| meta-Cymene | 175.7 | <−25 |
| para-Cymene | 176.0 | −73.5 |

| Group H | B.P., °C. | M.P., °C |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
|---|---|---|
| ortho-Nitrotoluene | 222.3 | α—10.6 β—4.1 |
| meta-Nitrotoluene | 231 | 15.5 |
| para-Nitrotoluene | 238 | 51.5 |

System consisting of any combination of two or more of the components within any one of the groups may be separated by the process of the invention, as well as systems made up of components selected from different groups; for example, benzene may be separated from a benzene-, n-hexane or n-heptane system in which the benzene is present in an amount greater than the eutectic concentration. In the same manner, para-xylene may be readily separated from a mixture of para- and meta-xylenes or from para-, meta-, and ortho-xylenes, or from a mixture of para-, meta-, and ortho-xylenes plus ethylbenzene and other compounds. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone, (1,4-benzenediol), paracresol, paradichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operaion is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained upon study of the accompanying drawings, in which:

Figure 1 is an over-all flow diagram of a preferred embodiment of my invention;

Figure 2 is a diagrammatic sectional view of a wet vacuum pump which is used in accordance with the invention;

Figure 3 is a diagrammatic sectional view of a rotary filter showing the means for cleaning the filter medium in accordance with this invention;

Figure 4 is an enlarged detailed drawing of stationary plate 81 and slide valve 79; and Figure 5 is an end view of the rotary filter shown in Figure 3.

Referring now to Figure 1, a mixture of materials from which at least one constituent is to be separated, is fed through a conduit 1, through a control valve 3 and into a scraped surface chiller 5. The temperature of the feed mixture in chiller 5 is adjusted so as to obtain crystals of at least a portion of at least one of the constituents of the mixture. Chiller 5 can be any conventional type chiller which is supplied with refrigeration means that are adequate to adjust the temperature of the mixture to that necessary to obtain crystals of at least a portion of a least one of the constitutents thereof. As will be apparent from the discussion hereinabove, the temperature to which the mixture is adjusted in chiller 5 depends entirely upon the specific feed mixture, since the various materials in the feed have different solidification points and since the solidification point of any given constituent of the feed mixture is dependent upon the composition of the feed mixture. When, for example, a mixture of isomeric $C_8$ alkyl benzenes is fed through conduit 1 to chiller 5, the temperature of that mixture is lowered to a temperature in the neighborhood of $-57°$ to $-78°$ C. When the desired component of the feed mixture is relatively dilute in the feed mixture, the temperature at which crystals will form will be relatively low. If the desired constituent is relatively concentrated in the feed, the temperature at which crystals will form will be relaively high. A cooling medium is passed through a jacket in the wall of chiller 5 via a conduit 7 and a conduit 9 to accomplish the aforedescribed adjustment of the temperature of the feed mixture.

The resulting slurry of crystals is passed from the chiller 5 into a filter 11 wherein the noncrystalline material is separated from the crystals. Filter 11 is a vacuum filter and, for illustrative purposes, a rotary vacuum filter is shown in Figure 1. Other vacuum filters, such as a belt-type vacuum filter, can also be used. A constant level 13 of the crystal slurry is maintained in the bottom of filter 11 by a level sensing device 15 which in turn controls the rate at which the feed mixture is introducted to chiller 5 by operating valve 3. The slurry level 13 can, of course, be maintained by hand control or any other suitable arrangement of automatic controls. The filter 11 comprises a rotating drum 17 which, in the specific embodiment shown, is one foot wide and three feet in diameter. Drum 17 is partially immersed in the slurry of crystals in the bottom of filter 11. Vacuum is applied to the lower section of this drum by a wet vacuum pump 19 through a conduit 21. As drum 17 rotates through the slurry of crystals in the bottom of filter 11, a cake of crystals and mother liquor is formed on the surface of drum 17 and mother liquor is removed from this cake through line 21 by a wet vacuum pump 19 and is passed to a liquid-gas separator 23. The liquid mother liquor is removed from separator 23 via a conduit 25 and entrained gases are removed from separator 23 via a conduit 27 and are returned via a conduit 29 to filter 11.

As was stated above, a vacuum is also applied to the upper portion of drum 17 by a wet vacuum pump 31 through a conduit 33 which connects pump 31 to the upper portion of drum 17. Similarly, the combined stream of mother liquor and entrained gases is discharged from pump 31 via a conduit 35 to a separator 37. Mother liquor is removed from separator 37 via a conduit 39 and is combined with mother liquor removed from separator 23 via conduit 25. The entrained gases from the mother liquor in conduit 35 are removed therefrom in separator 37 and passed via a conduit 41 to combine with the entrained gases from separator 23 in conduit 29 to be returned to filter 11.

A single wet vacuum pump may be used, in accordance with this invention, in place of the two wet vacuum pumps 19 and 31. In this event, it is usually desirable to provide suitable control means, not shown, so that a differential reduced pressure can be maintained in the upper and lower sections of drum 17.

Referring now to Figure 2, a diagrammatic sectional view of the wet vacuum pumps 19 and 31 is shown. Such pumps are well known in the art and may be described as a centrifugal displacement type of pump having an elliptical casing 43 partly filled with liquid 45, in which a round, multi-blade rotor 47 revolves freely. Rotor 47 comprises a plurality of curved rotor blades 49 which project radially from the hub 51 and form, with the side shrouds, a series of buckets. Rotor 47 revolves in a clockwise direction at a speed high enough to throw the liquid out from the center by centrifugal force, so that there results a solid ring of liquid revolving in the casing 43 at the same speed as the rotor 47, but hugging the walls of the elliptical casing 43. This action causes the liquid to enter and recede from the buckets in the rotor at high velocity. Pumps 31 and 19, also comprise a pair of inlet ports 53, 55 and a pair of discharge ports 57, 59. These ports are so placed in the cones shown in the figure that the expanding buckets draw gas from the inlet port, while the buckets in which the gas space is diminishing deliver the compressed gas to the outlet port. The drawing-in of gas, and discharge an instant later, takes place twice in one revolution. Such a wet vacuum pump is manufactured by Nash Engineering Company, Norwalk, Connecticut, and is called a Nash-Hytor pump or compressor.

Referring now to Figure 3, a diagrammatic sectional view of filter 11 is shown. Drum 17 comprises a filter medium or screen 61 upon which the cake of crystals and mother liquor is formed. Screen 61 can be formed from any suitable filtering means, such as cloth, paper, felt, glass fabric, synthetic fabrics, perforated or porous (sintered) metal or any combination of these or other filtering media as is necessary to effectively retain crystalline solids and pass liquid in the filtration of crystal slurries. Screen 61 is preferably a 24 x 150 mesh Dutch Weave Monel filter screen on top of a suitable support, not shown. Drum 17 is totally enclosed in a heavily insulated housing 63. The upper portion of housing 63 is fitted with windows 65, 67 in the side and with windows 69, 71 on either end of housing 63. Drum 17 is rotated by a rotatable shaft 73 and is divided into 16 sections 75 by radially extending members 77, as shown. Each of the sections 75 is connected to an opening in a slide valve 79. By proper construction of a stationary plate 81 of slide valve 79, as shown in Figure 4, it is possible to apply pressure or vacuum to any of sections 75 for any desired portion of the cycle through which the drum rotates. The slide valve 79 comprises a top section 83 and a bottom section 85, as is shown in Figure 4. An additional section may be provided if means for supplying blow-back to the drum are desired.

Referring further to Figure 3, a spring loaded scraper 87 is provided for removing crystals from rotating drum 17. The upper end of scraper 87 is curved slightly toward the outer surface of drum 17 and is very close to the surface of drum 17 but does not touch it. As drum 17 rotates in a counterclockwise direction, the crystals are removed by scraper 87 and passed via a conduit 89 to a purification means to be described hereinafter.

Further in accordance with this invention, a spray pipe 86 is provided for discharging a confined, hot fluid stream therethrough against the filter cake to completely remove crystals from the surface of screen 61. A hot fluid under pressure is conveyed through a conduit 88 to spray pipe 86 to be discharged against screen 61, and thereby to remove any crystalline material from screen 61 not removed by scraper 87. Spray pipe 86 is positioned adjacent to screen 61 immediately below scraper 87. Thus the heated fluid is sprayed against the filter medium immediately downstream of the scraper with respect to the direction of movement of the filter medium past the scraper. Any condensible fluid can be used for this purpose which is inert with respect to the mixture being filtered and has a freezing point sufficiently low that the fluid does not freeze upon striking the filter medium. A preferred fluid is the motor liquor itself which is heated by means not shown to the vapor state. Obviously, the use of heated mother liquor possesses the advantage of not introducing a foreign material into the system. For best results, the mother liquor is heated until its vapor is superheated. Thus, the sensible heat of the fluid as well as the more important latent heat of vaporization are taken advantage of by using a condensible fluid for this purpose.

Referring now to Figure 5, an end view of filter 11 is shown to more clearly illustrate the structure thereof, and particularly, to more clearly illustrate the structure of the filter cleaning means, spray pipe 86, and its relationship to scraper 87. It will be observed that spray pipe 86 extends across the full width of screen 61 and is located immediately below scraper 87. Referring again to Figure 1, the crystal cake removed from drum 17 by scraper 87 is passed via conduit 89 to chamber 91. An electrical vibrator 90 is attached to conduit 89 to aid the passage of the crystalline material therethrough. The crystalline material introduced into chamber 91 is moved directly into the upstream portion of a purification chamber of column 93 by a piston 95. Piston 95 is moved forward by fluid flow through a conduit 97 acting against a piston 99 connected to piston 95 by a piston rod 101 to such an extent that the forward face of piston 95 coincides with the side of purification chamber 93. Piston 95 has a porous face 103 which permits liquid in the crystals in chamber 91 to pass therethrough and out of chamber 91 via conduit 105. It is desirable to supply crystals to purification chamber 93 at a temperature which is sufficiently high to prevent freezing of the crystal mass to an impervious plug. To this end, heating material is passed through heating jacket 107 about chamber 91 by means of a conduit 109 and a conduit 111. During this heating some of the crystals will be melted and when the crystals are compacted in chamber 91 by piston 95, at least a portion of the thus produced melt is removed via conduit 105 as a result of the compacting.

The crystals which have been moved into chamber 93 are moved as an elongated crystal mass downwardly by a piston 113. Piston 113 is withdrawn by means of fluid flow through a conduit 115 and acting against a piston 117, which is connected to piston 113 by a piston rod 119. Piston 113 is moved in a downstream direction by flow of fluid through a conduit 121 and against piston 117. Piston 113 also comprises a porous face 123 which permits the passage therethrough of liquid from the crystal mass as it is compacted and out of chamber 93 via conduit 125.

In this manner, the crystals are moved downwardly through chamber 93 to a melting zone in the lower end thereof to come into heat exchange relationship with a heating element 127 where a portion of the crystals is melted. Heating element 127 may be any type of heating device, such as coils through which a heat exchange fluid is passed, or may be an electrical heating element provided within or without chamber 93. A portion of the melt thus produced is displaced countercurrently to the movement of the crystals and through a portion of the crystal mass so as to displace impurities from the crystal mass. The impurities which are displaced from the crystal mass are removed through a filter 129 and a conduit 131. Under some conditions of operation, the concentration of material corresponding to the purified material in the stream removed through conduit 131 is higher than its concentration in the feed mixture introduced via conduit 1 to chiller 5. In this event, the stream in conduit 131 can be passed by a conduit, not shown, back to chiller 5 wherein it is utilized to enrich the feed mixture. This results in formation of larger crystals than can be formed from a feed mixture containing a lower concentration of the desired component. If the concentration of the desired component in the stream removed via conduit 131 is relatively low, that stream may be disposed of as is desired. Purified product is removed from chamber 93 through a conduit 133.

In order to better illustrate my invention, I have provided the following example which is intended to exemplify the invention but not unduly to restrict it.

*Example*

A feed mixture comprising 17 percent by weight paraxylene, 17.5 percent by weight ortho-xylene, 33.4 percent by weight meta-xylene, 27.5 percent by weight ethyl benzene and 4.6 percent by weight toluene is supplied to the system at the rate of 1000 gallons per hour through conduit 1. Liquid material recovered as displaced liquid from chamber 93 through filter 129 comprises 53.1 percent para-xylene, 9.8 percent ortho-xylene, 18.7 percent meta-xylene, 15.6 percent ethyl benzene and 2.8 percent toluene. This stream is supplied to chiller 5 at 165 gallons per hour, together with the feed stream described hereinabove, the resulting composite feed comprising 22.1 percent para-xylene, 16.3 percent ortho-xylene, 31 percent meta-xylene, 26.2 percent ethyl benzene and 4.4 percent toluene at 1165 gallons per hour. That material is cooled to temperature of −76° C. in chiller 5 with the resultant formation of 15.1 percent solids. The slurry of mother liquor and crystals is passed to filter 11 wherein mother liquor having a para-xylene content of 6.75 percent is removed at a rate of 890 gallons per hour through conduits 21 and 33. In accordance with this invention, a wet vacuum pump is used to remove mother liquor from filter 11, by appling a vacuum equivalent to 20 inches of mercury to filter 11, and to discharge entrained gases at substantially the same temperature as the temperature of the mother liquor and at a positive pressure equal to 0.5 inch of water. The crystal material from which the mother liquor has been removed is 70 percent solids and is at a temperature of −76° F. That material is supplied to compacting chamber 91 wherein the crystal mass is further compressed while being heated to a temperature of −23° C. and a stream of 40 percent solids at that temperature is moved to purification column 93 at a rate of 275 gallons per hour. The crystals are compacted in column 93 and are moved as a compact mass downstream to the heating zone wherein the crystals are melted and a portion of the melt is displaced upstream through the compact crystal mass. A product which is about 99 percent para-xylene is removed through conduit 133 at a rate of 110 gallons per hour.

It will be apparent to those skilled in the art that various modifications of this invention can be made upon study of the accompanying disclosure. Such modifications are believed to be clearly within the spirit and the scope of this invention.

I claim:

1. In a vacuum filtering process for separating crystalline and non-crystalline material, a method for preventing obstruction of a filter medium used in said filtering process comprising passing a slurry of said crystalline and non-crystalline material in contact with said filter medium to form a crystalline cake thereon; scraping said crystalline cake from said filter medium; and directing under pressure a stream of superheated vapor of the non-crystalline material against said filter medium immediately following said scraping step, thererby to remove from said filter medium crystalline material adhering thereto.

2. In a vacuum filtering process for separating crystalline and non-crystalline material, a method for preventing obstruction of a filter medium used in said filtering process comprising passing a slurry of said crystalline and non-crystalline material in contact with said filter medium to form a crystalline cake thereon; displacing said non-crystalline material from said cake through said filter medium with gas having a temperature such that said crystalline material does not melt and recrystallize within the passages of said filter medium, thereby forming a stream of gas entrained in said non-crystalline material; compressing said stream so that said gas is maintained at substantially the same temperature as said non-crystalline material due to the contact therebetween; separating said gas from said non-crystalline material; recirculating said gas to the filtering zone for reuse in displacing non-crystalline material from cake on said filter medium; scraping said crystalline cake from said filter medium; and directing a stream of superheated vapor under pressure against said filter medium immediately following said scraping step, thereby to remove from said filter medium all crystalline material adhering thereto.

3. A process for fractional crystallization comprising adjusting the temperature of a mixture of materials so as to obtain a slurry of crystals of a component of said mixture in non-crystalline material thereof; passing said slurry to a closed filtering zone; passing said slurry in contact with a filter medium to form a crystalline cake thereon; displacing said non-crystalline material from said cake through said filter medium with gas having a temperature such that said crystalline material does not melt and recrystallize within the passages of said filter medium, thereby forming a stream of gas entrained in said non-crystalline material; compressing said stream so that said gas is maintained at substantially the same temperature as said non-crystalline material due to the contact therebetween; separating said gas from said non-crystalline material; recirculating said gas to the filtering zone for reuse in displacing non-crystalline material from cake on said filter medium; scraping said crystalline cake from said filter medium; and directing a stream of superheated vapor under pressure against said filter medium immediately following said scraping step, thereby to remove from said filter medium all crystalline material adhering thereto.

4. In a vacuum filtering apparatus having a closed chamber with slurry inlet means and solids discharge means and a filter medium within said chamber, an improved gas recirculating system comprising in combination conduit means connected to said closed chamber downstream of said filter medium; a liquid-seal gas pump adapted to pump gas-liquid mixtures and utilize the liquid in said mixture for the required liquid seal, said pump being operatively connected to said conduit means to draw gas and liquid through said filter medium and from said chamber; a gas-liquid separator downstream of said pump; means for removing liquid from said separator; and conduit means connecting said separator and said chamber for recirculating said gas thereto.

5. A vacuum filtering apparatus comprising a closed chamber having slurry inlet means and solids discharge means; means for maintaining a constant slurry level within said chamber; a continuous filter medium within said chamber partially in contact with the slurry and rotatable around an axis parallel to the surface of said slurry; a liquid-seal gas pump adapted to pump gas-liquid mixtures and utilize the liquid in said mixture for the required liquid seal; conduit means connecting the inlet of said pump with said chamber so that gas and liquid are moved through said filter medium and from said chamber; a gas-liquid separator downstream of said pump; means for removing liquid from said separator; and conduit means connecting said separator and said chamber for recirculating gas thereto.

6. An apparatus for separating crystalline from non-crystalline material comprising a closed chamber having a slurry inlet means and crystal discharge means; a filter medium within said chamber; means for depositing a slurry of crystalline and non-crystalline material upon said filter medium; scraper means for moving crystals from said filter medium into said discharge means; distributing means for directing a stream of pressurized vapor against said filter medium positioned posterior of said scraper means with respect to the direction of movement of said filter medium past said scraper means; conduit means for supplying superheated vapor to said distributing means; a liquid-seal gas pump adapted to pump gas-liquid mixtures and utilize the liquid in said mixture for the required liquid seal; conduit means connecting the inlet of said pump with said chamber so that gas and liquid are moved through said filter medium and from said chamber; a gas-liquid separating means positioned downstream of said pump; and means for recycling gas from said separating means to said chamber.

References Cited in the file of this patent

UNITED STATES PATENTS

| | | |
|---|---|---|
| 1,576,137 | Johnson | Mar. 9, 1926 |
| 1,667,465 | Wait | Apr. 24, 1928 |
| 1,991,548 | Motte | Feb. 19, 1935 |
| 2,081,296 | Gard | May 25, 1937 |
| 2,107,664 | Gee | Feb. 8, 1938 |
| 2,683,178 | Findlay | July 6, 1954 |